Feb. 9, 1954 — R. J. BONDLEY — 2,668,923
CURRENT COLLECTOR
Filed July 14, 1951 — 2 Sheets-Sheet 1
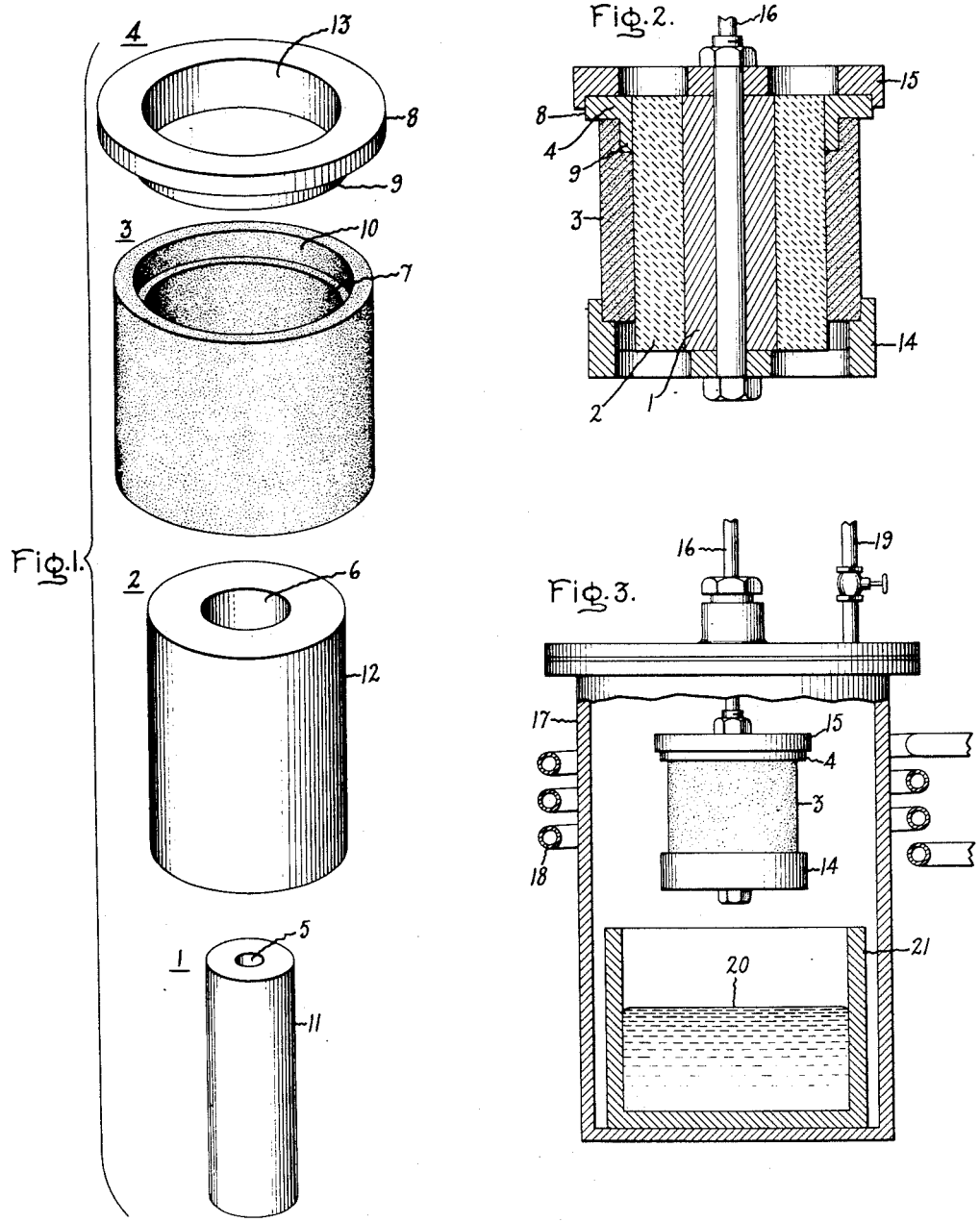
Inventor:
Ralph J. Bondley,
by Ernest   Britton
His Attorney.

Feb. 9, 1954 R. J. BONDLEY 2,668,923
CURRENT COLLECTOR
Filed July 14, 1951 2 Sheets-Sheet 2
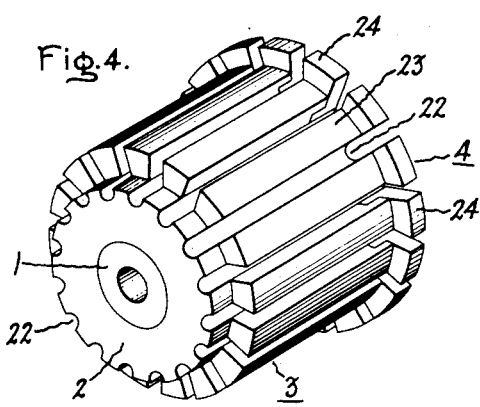
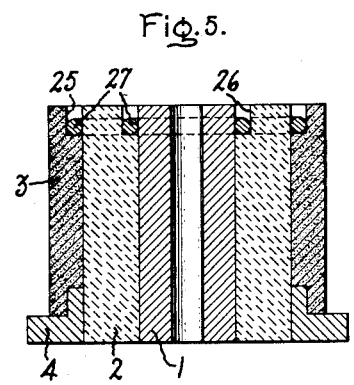
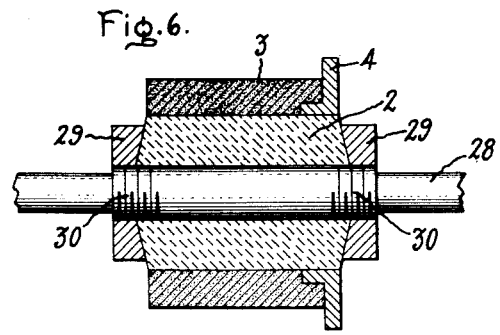
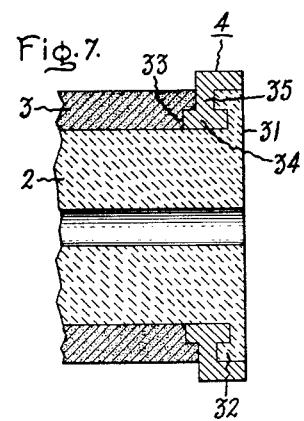
Inventor:
Ralph J. Bondley,
by Ernest C. Britton
His Attorney.

UNITED STATES PATENT OFFICE 2,668,923

CURRENT COLLECTOR

Ralph J. Bondley, Scotia, N. Y., assignor to General Electric Company, a corporation of New York Application July 14, 1951, Serial No. 236,761

5 Claims. (Cl. 310—236)

This invention relates to current collectors, for example, commutators for dynamoelectric machines.

In the construction of conventional commutator-type dynamoelectric machines, the commutator segments or bars are formed of suitable electrically-conducting metal, such as copper, and the brushes are formed of carbonaceous material, such as graphite. It is known that if the commutator of a dynamoelectric machine is constructed from carbonaceous material such as graphite, and the brushes formed of metal, such as copper, the wear with this combination is much less than that in the conventional design and, in fact, this commutator and brush assembly may last the life of the machine without requiring replacement or adjustment. However, in the past fabrication of a commutator with bars formed of carbonaceous material has been difficult or impractical due to the brittle characteristic of the carbon.

It is therefore an object of this invention to provide an improved current collector having a contact surface formed of carbonaceous material.

Further objects and advantages of this invention will be more apparent and the invention will be better understood by reference to the following description and the accompanying drawing, and the features of novelty which characterize this invention will be pointed out with particularity in the claims annexed to and forming a part of this specification.

In accordance with this invention, a current collector is provided having a cylinder formed of carbonaceous material, such as graphite, bonded to a core of ceramic material, such as high-fired alumina, which in turn is secured to the shaft of the machine in any suitable manner. In order to form a commutator, a plurality of longitudinal, evenly-spaced slots are formed around the periphery of the cylinder of graphite extending into the ceramic material. Since the graphite is weak in tension, it is desirable to have a separate member on which the leads from the armature windings are connected. Accordingly, a riser member formed of suitable electrically-conductive metal is provided, engaging one end of the graphite sleeve and being bonded to the ceramic core. The slots forming the commutator bars extend through the riser member to provide one riser for each bar. In the manufacture of this improved current collector member, a cylindrical core formed of ceramic material is provided, together with a cylindrical shell of carbonaceous material having a loose fit over the core. The mating surfaces of the two members are coated with titanium hydride, and the cylindrical shell member is then assembled on the core member. The assembly is then heated in a vacuum to the dissociation temperature of the titanium hydride, and the assembly is then immersed in molten solder. The solder penetrates the spaces between the core member and the shell member by capillary action, thus bonding the graphite shell to the ceramic core. The assembly is then removed from the solder and a plurality of longitudinally extending, evenly spaced slots may be formed around the outer periphery of the assembly, extending into the ceramic core to form commutator bars.

Referring now to the drawing, Fig. 1 is an exploded view showing the components of the improved current collector of this invention prior to assembly; Fig. 2 shows the assembled relationship of the components held in position by a clamping assembly; Fig. 3 shows the assembly being heated in an evacuated induction furnace; Fig. 4 shows the completed device after slotting to form a commutator; Fig. 5 shows an alternative method of bonding the graphite sleeve to the ceramic core; Fig. 6 shows an alternative method of mounting the assembly on a shaft; and Fig. 7 shows an alternative form of riser member.

Referring now to Fig. 1, the components of of this improved current collector assembly include an inner sleeve 1, a ceramic core 2, an outer sleeve 3, and a riser member 4. The sleeve member 1 is formed of suitable metal, for example, a 42%–58% nickel-iron alloy, and serves to mount the assembly on a shaft by means of a central opening 5. The cylindrical core member 2 is preferably formed of a high mechanical strength ceramic, such as a high-fired alumina, for example, aluminum oxide. The central opening 6 of the cylindrical core member 2 is of such size to permit a loose fit on the inner sleeve member 1. The outer cylindrical member 3 is formed of carbonaceous material, for example, a hard grade of graphite, and its central opening 7 is of such dimension as to permit a loose fit over the ceramic core member 2. The riser member 4 is formed of suitable electrically conductive material, such as a nickel-iron alloy, and is provided with a radially extending annular portion 8 and an axially extending annular portion 9, which is positioned, as shown in Fig. 2, in a suitable annular groove 10, formed in the inner surface of the cylindrical sleeve member 3 at the outer edge thereof.

In order to assemble the inner metallic sleeve member 1, the ceramic core member 2, the outer graphite sleeve member 3, and the riser member 4 into a complete assembly, the mating surfaces of these members are coated with a suitable solder bonding agent. These surfaces include the outer surface 11 of the inner sleeve member 1, the inner surface 6 and the outer surface 12 of the ceramic core member 2, the inner surface 7 and the surface of the groove 10 of the outer graphite sleeve member 3, and the inner surface 13 and the surface of the flange portion 9 of the riser member 4. A suitable solder bonding agent has been found to be titanium hydride suspended in a suitable liquid carrier, such as nitro-cellulose dissolved in a liquid such as amyl-acetate or acetone. This material is made up as a thin paint which is brushable or sprayable. It is desirable that it dry quickly after application to the various mating surfaces of the component parts, and therefore the nitro-cellulose is used as a fugitive binder to hold the titanium hydride powder on the surfaces, with no harmful residue remaining.

After the mating surfaces of the members have been coated with the titanium hydride, the inner metallic sleeve member 1, the ceramic core member 2, the outer cylindrical graphite member 3, and the riser member 4 are assembled, as shown in Fig. 2, and held in position by a clamping device including a lower member 14, an upper member 15, and a through-bolt 16, arranged in the central opening 5 of the inner sleeve member 1. The clearances should be such that a loose fit is provided between the inner sleeve member 1 and the ceramic core member 2, the core member 2 and the outer graphite sleeve member 3, and the core member 2 and the riser member 4. This fit should be on the order of .002 in. to .005 in. The assembly held in its clamped position by the clamping members 14 and 15 is then arranged in a suitable oven 17, which may be heated by induction by means of coils 18 and which may be evacuated through suction line 19. The oven 17 is then evacuated and the assembly heated to reach a temperature of approximately 500° C. to 600° C., in order to dissociate the hydride. In this dissociation, hydrogen is liberated, leaving metallic titanium on the parts. While the process is here described as being carried on in a vacuum, it will be readily understood that it can be also carried on in an inert gaseous atmosphere, such as helium or argon, or any gas which will not react with the titanium released from the hydrogen in the titanium hydride.

After the assembly has been heated a sufficient length of time to dissociate the hydride, it is immersed in molten solder 20, contained in solder pot 21 in the oven 17. This may be a lead-silver solder, with from 1½% to 10% silver. The solder penetrates the spaces between the members by capillary action to complete the bond between the various components. The metallic titanium left on the surfaces of the parts dissolves into the solder, forming an alloy for a minute distance into the solder, and reacts with the ceramic to form a tight bond between the ceramic core 2 and the outer graphite sleeve member 3, the riser member 4, and the inner sleeve member 1. The titanium-hydride soldering technique is more fully described in application Serial No. 36,289, Kelly, filed May 30, 1948, now Pat. #2,570,248, and assigned to the assignee of this application, and in my application Serial No. 36,244, also filed May 30, 1948, and also assigned to the assignee of the present application.

The assembly is then withdrawn from the molten solder before the solder solidifies and, after cooling, the outer surface is turned to size. If it is desired to form a commutator, as indicated in Fig. 4, a plurality of longitudinally extending, evenly spaced slots 22 are formed in the outer periphery, extending into the ceramic core 2. This slotting defines individual commutator segments or bars 23, which are completely insulated from each other, each bar having an associated metal riser 24 for making connections to the armature windings.

It will be readily apparent that a current collector constructed in accordance with this invention, in addition to giving long life, has a further advantage in that it contains no organic insulation, so that it is immune to oils or solvents. Furthermore, this current collector is held together by soldering rather than by clamping, so that there is no possibility for a high bar to develop during operation. The lack of organic insulation also allows operation of the device at high temperatures without aging effects. While the outer sleeve 3 has been referred to as being formed of carbonaceous material, it will be readily apparent that this invention is not limited to such material and that any suitable refractory conductive material may be used such as the borides, silicides, nitrides, carbides, or sulphides.

Referring now to Fig. 5, in which like elements are indicated by like reference numerals, there is shown a modification in which the immersion of the assembly in molten solder, as shown in Fig. 3, is not necessary. Here, an annular groove 25 is formed in the inner surface of the outer graphite sleeve member 3 at its edge remote from the riser member 4, and a similar annular groove 26 is formed in the inner surface of the ceramic core member 2 adjacent its edge remote from the riser member 4. Rings of solder 27 are arranged in these annular grooves which melt when the assembly is heated in the oven to dissociate the hydride and the molten solder runs into the spaces between the members 1, 2, 3 and 4 by capillary action.

Referring now to Fig. 6 in which like elements are again indicated by like reference numerals, there is shown an embodiment eliminating the inner metallic sleeve member 1. In this form, the assembly is mounted on the shaft 28 by means of clamping nuts 29 threadingly engaging threaded portion 30 on the shaft 28, and clamping the ceramic core member 2.

Referring now to Fig. 7, a modified form of riser member is shown. Here, the ceramic core member 2 is provided with a radially extending flange portion 31 with an axially extending reentrant flange portion 32 formed at its outer periphery. An annular groove 33 is formed in the inner surface of the outer graphite sleeve member 3 at its outer end and the outer graphite sleeve member 3 is spaced from the annular flange portion 31 of the ceramic core member 2 to provide an annular dovetailed opening. The riser member 4 is provided with a base portion 34 and a neck portion 35, thus filling the annular dovetailed groove between the outer graphite sleeve member 3 and the annular flange 31 of the ceramic core member 2.

It will be readily apparent that this invention provides an improved current collector and commutator assembly which is characterized by its simplicity, and greatly improved life.

While I have illustrated and described several embodiments of this invention, further modifications and improvements will occur to those skilled in the art. I desire it to be understood, therefore, that this invention is not limited to the forms shown, and I intend in the appended claims to cover all modifications which do not depart from the spirit and scope of this invention.

What I claim as new and desire to secure by Letters Patent of the United States is:

1. A commutator comprising a cylindrical ceramic core member, a plurality of evenly spaced longitudinal bars of refractory conductive material arranged around a periphery of said core member and respectively bonded thereto, and a plurality of risers formed of electrically conductive metal for making electrical connections to said bars respectively bonded to said core member and said bars.

2. A commutator comprising a cylindrical ceramic core member, means for securing said core member to a shaft, a plurality of evenly spaced longitudinal bars formed of refractory conductive material arranged around the periphery of said core member and respectively bonded thereto, and a plurality of risers formed of electrically conductive metal for making electrical connections to said bar and respectively bonded to said core member and said risers.

3. A commutator comprising a cylindrical ceramic core member, a plurality of evenly spaced longitudinal bars formed of refractory conductive material arranged around the periphery of said core member and respectively bonded thereto, each of said bars having a cutaway portion on its inner surface at one end thereof, and a plurality of risers formed of electrically conductive metal for making electrical connections to said bars respectively having portions positioned in said cutaway portions of said bars, said risers being respectively bonded to said core member and to said bars.

4. A commutator comprising a cylindrical ceramic core member, a plurality of evenly spaced longitudinally extending bars formed of refractory conductive material arranged around the periphery of said core member and respectively bonded thereto, each of said bars having a cutaway portion on its inner surface at one end thereof, said core member having an annular flange formed at one end with an annular groove formed in the face thereof on the side adjacent said bars, said bars being spaced from said core member flange forming an annular dovetailed slot, and a plurality of risers formed of electrically conductive metal for making electrical connections to said bars, said risers having portions arranged in said dovetailed slots and being respectively bonded to said core member and said bars.

5. A commutator comprising a cylindrical ceramic core member, and a plurality of evenly spaced longitudinal bars of refractory conductive material arranged around the periphery of said core member and respectively bonded thereto.

RALPH J. BONDLEY.

References Cited in the file of this patent

UNITED STATES PATENTS

| Number | Name | Date |
|---|---|---|
| 468,752 | Shaw | Feb. 9, 1892 |
| 842,829 | Duncan | Jan. 29, 1907 |
| 1,811,180 | Landers | June 23, 1931 |
| 2,236,257 | Borchers | Mar. 25, 1941 |
| 2,275,177 | Crans | Mar. 3, 1942 |
| 2,306,028 | Conradty | Dec. 22, 1942 |
| 2,320,541 | Wilson | June 1, 1943 |
| 2,570,248 | Kelley | Oct. 9, 1951 |

FOREIGN PATENTS

| Number | Country | Date |
|---|---|---|
| 539,175 | France | Mar. 29, 1922 |
| 874,264 | France | Apr. 27, 1942 |
| 893,126 | France | Jan. 17, 1944 |

OTHER REFERENCES

Electronics Magazine, July 1947, pages 97–99.